(12) United States Patent
Engler et al.

(10) Patent No.: US 11,693,945 B2
(45) Date of Patent: Jul. 4, 2023

(54) SECURE CALLS BETWEEN APPLICATIONS

(71) Applicant: SAP SE, Walldorf (DE)

(72) Inventors: Michael Engler, Walldorf (DE);
Martijn de Boer, Heidelberg (DE);
Wolfgang Janzen, Mannheim (DE);
Peter Eberlein, Malsch (DE)

(73) Assignee: SAP SE, Walldorf (DE)

( * ) Notice: Subject to any disclaimer, the term of this patent is extended or adjusted under 35 U.S.C. 154(b) by 922 days.

(21) Appl. No.: 15/355,379

(22) Filed: Nov. 18, 2016

(65) Prior Publication Data

US 2018/0144117 A1  May 24, 2018

(51) Int. Cl.
*G06F 21/44* (2013.01)
*G06F 16/951* (2019.01)
*G06F 21/62* (2013.01)

(52) U.S. Cl.
CPC ............ *G06F 21/44* (2013.01); *G06F 16/951* (2019.01); *G06F 21/629* (2013.01)

(58) Field of Classification Search
CPC ....... G06F 21/44; G06F 16/951; G06F 21/629
See application file for complete search history.

(56) References Cited

U.S. PATENT DOCUMENTS

| | | | |
|---|---|---|---|
| 5,828,833 A * | 10/1998 | Belville | G06F 9/547 726/11 |
| 7,523,142 B2 | 4/2009 | Driesen et al. | |
| 7,657,575 B2 | 2/2010 | Eberlein et al. | |
| 7,720,992 B2 | 5/2010 | Brendle et al. | |
| 7,734,648 B2 | 6/2010 | Eberlein | |
| 7,739,387 B2 | 6/2010 | Eberlein et al. | |
| 7,894,602 B2 | 2/2011 | Mueller et al. | |
| 7,971,209 B2 | 6/2011 | Eberlein et al. | |
| 8,126,919 B2 | 2/2012 | Eberlein | |
| 8,200,634 B2 | 6/2012 | Driesen et al. | |
| 8,225,303 B2 | 7/2012 | Wagner et al. | |
| 8,250,135 B2 | 8/2012 | Driesen et al. | |
| 8,291,038 B2 | 10/2012 | Driesen | |
| 8,301,610 B2 | 10/2012 | Driesen et al. | |
| 8,356,010 B2 | 1/2013 | Driesen | |

(Continued)

OTHER PUBLICATIONS

Chaim Bendelac, Developing with XS Advanced: Add authorization, Mar. 2016, pp. 1-11 (Year: 2016).*

(Continued)

*Primary Examiner* — Luu T Pham
*Assistant Examiner* — Canh Le
(74) *Attorney, Agent, or Firm* — Fish & Richardson P.C.

(57) ABSTRACT

A security configuration file is received from a first application, the security configuration file including information of an authority. The first application assigns the authority to a second application to enable the second application to trigger jobs at the first application, and the second application provides shared services to a plurality of applications including the first application. A query is received from the second application and in response the authority is sent to the second application. A request for a token is received from the second application, the request including the authority. A token including the authority is sent to the second application. The second application sends the token to the first application when the second application triggers jobs at the first application.

12 Claims, 4 Drawing Sheets

(56) References Cited

U.S. PATENT DOCUMENTS

| | | | |
|---|---|---|---|
| 8,375,130 B2 | 2/2013 | Eberlein et al. | |
| 8,380,667 B2 | 2/2013 | Driesen | |
| 8,392,573 B2 | 3/2013 | Lehr et al. | |
| 8,402,086 B2 | 3/2013 | Driesen et al. | |
| 8,407,297 B2 | 3/2013 | Schmidt-Karaca et al. | |
| 8,434,060 B2 | 4/2013 | Driesen et al. | |
| 8,467,817 B2 | 6/2013 | Said et al. | |
| 8,479,187 B2 | 7/2013 | Driesen et al. | |
| 8,560,876 B2 | 10/2013 | Driesen et al. | |
| 8,566,784 B2 | 10/2013 | Driesen et al. | |
| 8,572,369 B2 | 10/2013 | Schmidt-Karaca et al. | |
| 8,604,973 B2 | 12/2013 | Schmidt-Karaca et al. | |
| 8,612,406 B1 | 12/2013 | Said et al. | |
| 8,645,483 B2 | 2/2014 | Odenheimer et al. | |
| 8,706,772 B2 | 4/2014 | Hartig et al. | |
| 8,751,573 B2 | 6/2014 | Said et al. | |
| 8,762,731 B2 | 6/2014 | Engler et al. | |
| 8,762,929 B2 | 6/2014 | Driesen | |
| 8,793,230 B2 | 7/2014 | Engelko et al. | |
| 8,805,986 B2 | 8/2014 | Driesen et al. | |
| 8,875,122 B2 | 10/2014 | Driesen et al. | |
| 8,880,486 B2 | 11/2014 | Driesen et al. | |
| 8,924,384 B2 | 12/2014 | Driesen et al. | |
| 8,924,565 B2 | 12/2014 | Lehr et al. | |
| 8,972,934 B2 | 3/2015 | Driesen et al. | |
| 8,996,466 B2 | 3/2015 | Driesen | |
| 9,003,356 B2 | 4/2015 | Driesen et al. | |
| 9,009,105 B2 | 4/2015 | Hartig et al. | |
| 9,026,502 B2 | 5/2015 | Driesen et al. | |
| 9,026,857 B2 | 5/2015 | Becker et al. | |
| 9,031,910 B2 | 5/2015 | Driesen | |
| 9,032,406 B2 | 5/2015 | Eberlein | |
| 9,069,832 B2 | 6/2015 | Becker et al. | |
| 9,069,984 B2 | 6/2015 | Said et al. | |
| 9,077,717 B2 | 7/2015 | Said et al. | |
| 9,100,390 B1* | 8/2015 | Asnis | H04M 15/8228 |
| 9,122,669 B2 | 9/2015 | Demant et al. | |
| 9,137,130 B2 | 9/2015 | Driesen et al. | |
| 9,182,979 B2 | 11/2015 | Odenheimer et al. | |
| 9,183,540 B2 | 11/2015 | Eberlein et al. | |
| 9,189,226 B2 | 11/2015 | Driesen et al. | |
| 9,223,985 B2 | 12/2015 | Eberlein et al. | |
| 9,229,707 B2 | 1/2016 | Borissov et al. | |
| 9,256,840 B2 | 2/2016 | Said et al. | |
| 9,262,763 B2 | 2/2016 | Peter et al. | |
| 9,724,757 B2 | 8/2017 | Barrett | |
| 2008/0120129 A1 | 5/2008 | Seubert et al. | |
| 2011/0320469 A1* | 12/2011 | Canessa | G06F 19/321 707/758 |
| 2013/0325672 A1 | 12/2013 | Odenheimer et al. | |
| 2013/0332424 A1 | 12/2013 | Nos et al. | |
| 2014/0047319 A1 | 2/2014 | Eberlein | |
| 2014/0101099 A1 | 4/2014 | Driesen et al. | |
| 2014/0108440 A1 | 4/2014 | Nos | |
| 2014/0164963 A1 | 6/2014 | Klemenz et al. | |
| 2014/0325069 A1 | 10/2014 | Odenheimer et al. | |
| 2014/0379677 A1 | 12/2014 | Driesen et al. | |
| 2015/0006608 A1 | 1/2015 | Eberlein et al. | |
| 2015/0089569 A1* | 3/2015 | Sondhi | H04L 63/0807 726/1 |
| 2015/0100546 A1 | 4/2015 | Eberlein et al. | |
| 2015/0178332 A1 | 6/2015 | Said et al. | |
| 2015/0339482 A1* | 11/2015 | Wurster | G06F 21/629 726/30 |
| 2016/0065555 A1* | 3/2016 | Branden | H04L 63/0807 726/7 |
| 2016/0072904 A1* | 3/2016 | Asnis | H04L 63/0823 709/224 |
| 2017/0025441 A1 | 1/2017 | Mori | |
| 2017/0214683 A1* | 7/2017 | Kroehling | H04L 63/0807 |
| 2017/0223026 A1* | 8/2017 | Amiri | H04L 63/123 |

OTHER PUBLICATIONS

Sven Bugiel, "Towards Taming Privilege-Escalation Attacks on Android," 2012, pp. 1-18. (Year: 2012).*
Tai Garfinkel, "Ostia: A Delegating Architecture for Secure System Call Interposition," 2004, pp. 1-15. (Year: 2004).*
U.S. Appl. No. 14/960,983, filed Dec. 7, 2015, Eberlein, et al.
U.S. Appl. No. 15/083,918, filed Mar. 29, 2016, Eberlein, et al.
U.S. Appl. No. 15/087,677, filed Mar. 31, 2016, Eberlein, et al.

* cited by examiner

SECURE CALLS BETWEEN APPLICATIONS

BACKGROUND

In some computer systems, one application can call another application and trigger execution of the other application's codes (that is, trigger a job execution by the other application). For example, a central job scheduler application can provide job scheduling services to multiple client applications. Each client application can let the job scheduler know a time schedule of when to trigger jobs. Based on the time schedule, the job scheduler can automatically call the client application at certain times, maybe repeatedly with a certain time interval, to trigger jobs. However, the client application needs to make sure that it is the job scheduler calling, not a malicious application pretending to be the job scheduler.

SUMMARY

The present disclosure describes methods and systems, including computer-implemented methods, computer program products, and computer systems for secure calls between applications.

In an implementation, a security configuration file is received from a first application, the security configuration file including information of an authority. The first application assigns the authority to a second application to enable the second application to trigger jobs at the first application, and the second application provides shared services to a plurality of applications including the first application. A query is received from the second application and in response the authority is sent to the second application. A request for a token is received from the second application, the request including the authority. A token including the authority is sent to the second application. The second application sends the token to the first application when the second application triggers jobs at the first application.

The above-described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/the instructions stored on the non-transitory, computer-readable medium.

The subject matter described in this specification can be implemented in particular implementations so as to realize one or more of the following advantages. First, the described approach enables an application to grant permission to a shared-service application (that is, an application that provides services shared by multiple applications, such as a central job scheduler) so that the shared-service application can make calls to the application (for example, to trigger job executions) in a secure manner. Second, the described approach defines a deployment protocol for an application to enable an automated configuration of shared services so that permission is automatically granted to the shared-service application at the deployment of the application, reducing manual administrator operations. Third, the described approach enables a called application to determine whether a calling application is a trustworthy entity. Fourth, the described approach prevents a malicious application from acting as a shared-service application to gain permission and make calls (for example, to trigger jobs) to other applications. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The following detailed description describes secure calls between applications and is presented to enable any person skilled in the art to make and use the disclosed subject matter in the context of one or more particular implementations. Various modifications to the disclosed implementations will be readily apparent to those of ordinary skill in the art, and described principles may be applied to other implementations and applications without departing from scope of the disclosure. Thus, the present disclosure is not intended to be limited to the described or illustrated implementations, but is to be accorded the widest scope consistent with the principles and features disclosed herein.

In some computer systems, one application can call another application and trigger execution of the other application's codes (that is, trigger a job execution by the other application). For example, a central job scheduler application can provide job scheduling services to multiple client applications. Each client application can let the job scheduler know a time schedule of when to trigger jobs. Based on the time schedule, the job scheduler can automatically call the client application at certain times, maybe repeatedly with a certain time interval, to trigger jobs. However, the client application needs to make sure that it is the job scheduler calling, not a malicious application that pretends to be the job scheduler.

At a high-level, the described approach enables an application (that is, a called application) to grant permission to another application (that is, a calling application) so that the calling application can call the called application to trigger jobs by the called application. The calling application can be a shared-service application that provides services shared by multiple applications, such as a central job scheduler. The described approach sets up technical calls between system components in a secure manner, enabling authentication and authorization of applications and constraining the power of the calling application in the called application. In some implementations, an OAuth Client Credentials Flow and a communication mechanism backed with persistence operations between CLOUD FOUNDARY Service Brokers are used to enable the secure constrained delegation. The described approach prevents a malicious application from intercepting OAuth tokens from a well-behaving application while follows least-privilege principles.

In the following description of the described approach, a central job scheduler application is used as an example of the shared-service application and the calling application. As will be understood by those of ordinary skill in the art, other shared-service applications and calling applications consistent with this disclosure can also be used in the described approach.

The described approach can include the following three steps. First, as will be discussed in FIG. 1, when a called application that supports shared job scheduling services is deployed, the called application can grant permission (also called authority) to the job scheduler application for job triggering by including the authority in a security configuration file. During the deployment of the called application, the called application can contact a central authentication component such as a user account and authentication (UAA) application and automatically create a UAA service instance. The called application can also register with the job scheduler application and automatically create a job scheduler service instance. These service instances can automatically bound to the called application. During the deployment of the called application, the UAA application can store information of the authority, such as the name of the authority, the application that grants the authority, and the application to which the authority is granted. The job scheduler application can also obtain information of the authority that has been granted to the job scheduler by the called application.

Second, the called application can schedule a job execution at the job scheduler application. For example, the called application can make use of the bound job scheduler service instance to contact the job scheduler application in a secure manner and schedule a job at a predetermined time. In a typical implementation, the job scheduler application can securely identify the called application once the called application registers at the job scheduler application.

Third, as will be discussed in FIG. 2, when the predetermined time arrives, the job scheduler application can trigger the job execution by the called application (for example, executing all or a part of the called application's codes). When the job scheduler application calls the called application, the job scheduler can send a token including the authority that the called application has granted to the job scheduler. Upon receiving the token, the called application can verify that it is indeed the job scheduler calling, not a malicious application, by the validating the authority in the token.

Figure 1:
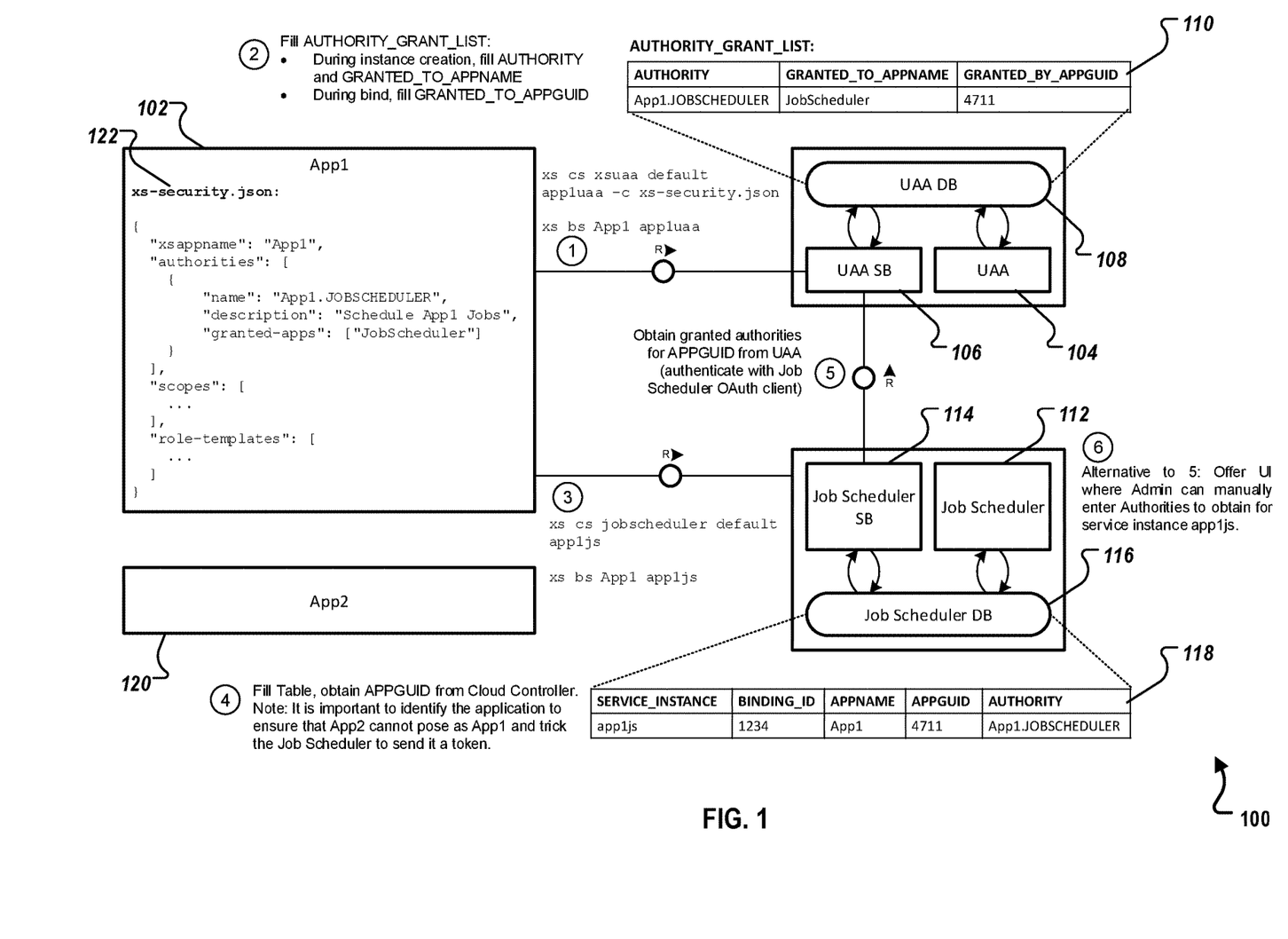
FIG. 1 is a flowchart illustrating an example method for a called application granting permission to a calling application for secure calls between applications, according to an implementation.

FIG. 1 is a flowchart illustrating an example method 100 for a called application granting permission to a calling application for secure calls between applications, according to an implementation. The method 100 is performed when the called application is deployed. For clarity of presentation, the description that follows generally describes method 100 in the context of the other figures in this description. However, it will be understood that method 100 may be performed, for example, by any suitable system, environment, software, and hardware, or a combination of systems, environments, software, and hardware as appropriate. In some implementations, various steps of method 100 can be run in parallel, in combination, in loops, or in any order.

The flowchart in FIG. 1 includes a called application App1 102, a called application App2 120, a central authentication component UAA 104 together with a UAA Service Broker (SB) 106 and a UAA database (DB) 108, and a job scheduler application 112 together with a job scheduler SB 114 and a job scheduler DB 116. App1 102 and App2 120 support job scheduling services, allowing the job scheduler application 112 to call them and trigger jobs. App1 102 also has an OAuth client that can perform tasks associated with OAuth for authorization.

The UAA 104 can provide central identity management services, issuing tokens to authenticate and authorize users or client applications. For example, the UAA 104 can be an OAuth provider and issue JavaScript Object Notation (JSON) web tokens (JWTs). The UAA 104 can also be an application providing authentication and authorization services. The UAA SB 106 can advertise a catalog of services managed by the UAA SB 106 for client applications to use. The UAA SB 106 can also receive and interpret calls from client applications to create, bind, unbind, and delete service instances of UAA services provided by the UAA 104, and manage the service instances. For example, if a client application calls the UAA SB 106 for authentication and authorization services, the UAA SB 106 can create a service instance and bind the service instance to the client application. If multiple client applications call the UAA SB 106 for services, the UAA SB 106 can create multiple service instances, for example, each service instance is bound to one client application. In some implementations, the UAA SB 106 can be a part of the UAA 104. The UAA DB 108 can store information for the UAA 104 and the UAA SB 106. In some implementations, as shown in FIG. 1, the UAA SB 106 and the UAA 104 can share the UAA DB 108. In some implementation, the UAA 104 can be in a Cloud Foundry or other computer systems or environments consistent with this disclosure. Cloud Foundry is an open source cloud computing platform as a service (PaaS) that enables applications to be easily deployed and supported in a cloud computing system or environment. In some implementations, App1 102 and the UAA 104 can be in the same Cloud Foundry.

The job scheduler application 112 provides central job scheduling services that can create or triggers jobs on client applications. The job scheduler application 112 can have an OAuth client performing tasks associated with OAuth for authorization. The job scheduler SB 114 can advertise a catalog of service managed by the job scheduler SB 114 for client applications to use. The job scheduler SB 114 can interpret calls to create, bind, unbind, and delete service instances of job scheduling services provided by the job scheduler application 112. For example, if a client application calls the job scheduler SB 114 for job scheduling services, the job scheduler SB 1114 can create a service instance and bind the service instance to the client application. If multiple client applications call the job scheduler SB 114 for services, the job scheduler SB 114 can create multiple service instances, for example, each service instance is bound to one client application. The job scheduler DB 116 can store information for the job scheduler application 112 and the job scheduler SB 114. In some implementations, the job scheduler SB 114 and the job scheduler application 112 can share the job scheduler DB 116.

In some implementations, method 100 can also involve a cloud controller, which is not shown in FIG. 1 for brevity. The cloud controller can be a component in the Cloud Foundry that hosts the UAA 104. In some implementations, the cloud controller provides Representational State Transfer (REST) application program interface (API) endpoints for access the Cloud Foundry. For example, the cloud controller can be queried for global unique identifiers (GUIDs) of applications deployed in the Cloud Foundry.

At step 1, during the deployment of App1 102, App1 102 contacts the UAA SB 106 and triggers the UAA SB 106 to create a UAA service instance and bind the UAA service instance to App1 102. In some implementations, App1 102 can include a security configuration file 122, for example, as shown in FIG. 1, a JSON file named xs-security.json. The configuration file 122 can include a section named "authorities" that contains a list of authorities that App1 102 wants to validate. For example, the security configuration file 112 xs-security.json indicates that an authority named "App1.JOBSCHEDULER" will be granted to the OAuth client of the job scheduler application 112 by including "Job Scheduler" in the element "granted-apps". In other words, App1 102 assigns the authority "App1.JOBSCHEDULER" to the job scheduler application 112 so that the job scheduler application 112 is entitled to receive a token from the UAA 104 with the authority "App1.JOB SCHEDULER" in the token. When the job scheduler application 112 calls App1 102 to trigger jobs, the job scheduler application 112 will send the token from the UAA 104 to App1 102, and App1 102 will validate that the token includes the authority "App1.JOBSCHEDULER" which was assigned to the job scheduler application 112.

During the deployment of App1 102, the security configuration file 122 can be uploaded to the UAA SB 106, and the UAA SB 106 can create a UAA service instance and bind the UAA service instance to App1 102. The service instance creation and binding can be triggered, using either manual command-line input or automated deployment services based on scripts or metadata description files that can automatically trigger the service instance creation and binding. For example, as shown in FIG. 1, the following lines can be used to trigger the UAA service instance creation and binding for App1 102:

| 010 | xs cs xsuaa default app1uaa -c xs-security.json |
| 020 | xs bs App1 app1uaa |

Line 010 triggers the UAA SB 106 to create a UAA service instance called "app1uaa" and configure the UAA service instance "app1uaa" with parameters specified in the security configuration file 122 xs-security.json. For example, the UAA service instance "app1uaa" can be configured to include the authority "App1.JOB SCHEDULER" as specified in xs-security.json file. Line 020 triggers the UAA SB 106 to bind the UAA service instance "app1uaa" to App1 102.

In some implementations, if UAA SB 106 and UAA 104 are separated, besides the UAA Uniform Resource Locator (URL), the UAA SB URL needs to be included in the credential section of, for example, the security configuration file 122 so that the bound application (for example, App1 102) knows how to contact the UAA SB 106. From step 1, method 100 proceeds to step 2.

At step 2, after the UAA SB 106 creates the UAA service instance "app1uaa," the UAA SB 106 enriches the OAuth client of App1 102 with permission to obtain the authority "App1.JOBSCHEDULER" so that when the job scheduler application 112 calls App1 102 to trigger jobs, App1 102 can validate that the token from the job scheduler application 112 includes the authority "App1.JOBSCHEDULER." In addition, the UAA SB 106 enriches the OAuth client of the job scheduler application 112 with permission to obtain the authority "App1.JOBSCHEDULER" so that the job scheduler application 112 is entitled to receive a token including the authority "App1.JOBSCHEDULER" from the UAA 104. In other words, the UAA SB 106 gives permission to the OAuth client of job scheduler application 112 to receive a token including the authority and gives permission to the OAuth client of App1 102 to validate the authority.

When the UAA service instance "app1uaa" is bound to App1 102 (that is, during the binding operation), the UAA SB 106 can query the cloud controller to obtain the application GUID of App1 102 (for example, as shown in FIG. 1, the application GUID of App1 102 is "4711"). This is to ensure that when the job scheduler application 112 requests a token for App1 102, the job scheduler application 112 will include the right authority. Information of authorities can be stored in a table within the UAA DB 108. For example, an authority table 110 named "AUTHORITY_GRANT_LIST" can include one or more entries, each entry corresponding to one authority. The authority table 110 can include three columns, the AUTHORITY column indicates the name of the authority, the GRANTED_TO_APPNAME column indicates the name of the application to which the authority is granted, and the GRANTED_BY_APPGUID column indicates the GUID of the application that grants the authority. For example, the authority "App1.JOBSCHEDULER" is granted to the application "Job Scheduler" by the application of GUID 4711. In some implementations, the columns AUTHORITY and GRANTED_TO_APPNAME are filled during the service instance creation, and the column GRANTED_BY_APPGUID is filled during the service instance binding. From step 1, method 100 proceeds to step 2.

At step 3, App1 102 contacts the job scheduler SB 114 to trigger the job scheduler SB 114 to create a job scheduler service instance and bind the job scheduler service instance to App1 102. Similar to the UAA service instance, the job scheduler service instance creation and binding can be triggered, using either manual command-line input or automated deployment services based on scripts or metadata description files that can automatically trigger the service instance creation and binding. For example, as shown in FIG. 1, the following lines can be used to trigger the job scheduler service instance creation and binding for App1 102:

| 110 | xs cs jobscheduler default app1js |
| 120 | xs bs App1 app1js |

Line 110 triggers the job scheduler SB 114 to create a job scheduler service instance called "app1js." Line 120 triggers the job scheduler SB 114 to bind the job scheduler service instance "app1js" to App1 102. From step 3, method 100 proceeds to step 4.

At step 4, when the job scheduler service instance "app1js" is bound to App1 102 (that is, during the binding operation), similar to what the UAA SB 106 has done, the job scheduler SB 114 can query the cloud controller to obtain the GUID of the application that is bound to the job scheduler service instance. In some implementations, the job scheduler SB 114 can also query the cloud controller to obtain the name of the application that is bound to the job scheduler service instance. The information of the job scheduler service instance can be stored in a service instance table 118 within the job scheduler DB 116. The service instance table 118 can include one or more entries, each entry corresponding to one service instance. The service instance table 118 can include a SERVICE INSTANCE column indicating the name of the service instance, a BINDING ID column indicating a binding identifier for the service instance, an APPNAME column and an APPGUID column indicating the name and GUID of the application that is bound to the service instance, respectively. For example, the service instance "appjs" is bound to the application "App1" of GUID "4711", and the binding identifier is "1234." From step 3, method 100 proceeds to step 5 or step 6.

In some cases, with more and more applications being deployed that want to use the job scheduler application 112 to schedule jobs, the job scheduler application 112 can collect more and more authorities. If no particular care is taken, a malicious application (for example, App2 120) could register with the job scheduler, let the job scheduler to trigger a job execution, and could possibly obtain a token containing the authorities not only for App2 120 but also for App1 102 (and other applications having empowered the job scheduler to schedule their jobs). App2 120 could now re-use this received token, pretend to be the job scheduler, and schedule jobs on App1 102. For addressing this thread, Step 5 or Step 6 can be used.

At step 5, when the job scheduler service instance "app1js" is bound to App1 102 (during the binding operation), the job scheduler SB 114 can contact the UAA SB 106 and query the authorities that have been granted by App1 102. For example, the job scheduler SB 114 can send App1's GUID "4711" to the UAA SB 106, the UAA SB 106 can check the GRANTED_BY_APPGUID column and the AUTHORITY column in the authority table 110 AUTHORITY_GRANT_LIST and return the authority "App1.JOBSCHEDULER" to the job scheduler SB 114. The received authority information can be stored in the service instance table 118 within the job scheduler DB 116, for example, in the AUTHORITY column. By doing so, when the job scheduler application 112 contacts the UAA 104 to request a token for App1 102, the job scheduler application 112 can include the authority "App1.JOBSCHEDULER" granted by App1 102 in the request, and in response the UAA 104 can return a token including the authority "App1.JOBSCHEDULER." In some implementations, UAA SB 106 provides Representational State Transfer (REST) service that allows to query granted authorities per application GUID. From step 5, method 100 stops.

Step 6 can be used as an alternative to step 5. At step 6, the job scheduler application 112 can offer a user interface so that an administrative user can manually enter the authority associated with the job scheduler service instance "appjs". For example, the user interface can provide a list of authorities, and the administrative user can select the authority "App1.JOBSCHEDULER" from the list. From step 6, method 100 stops.

Figure 2:
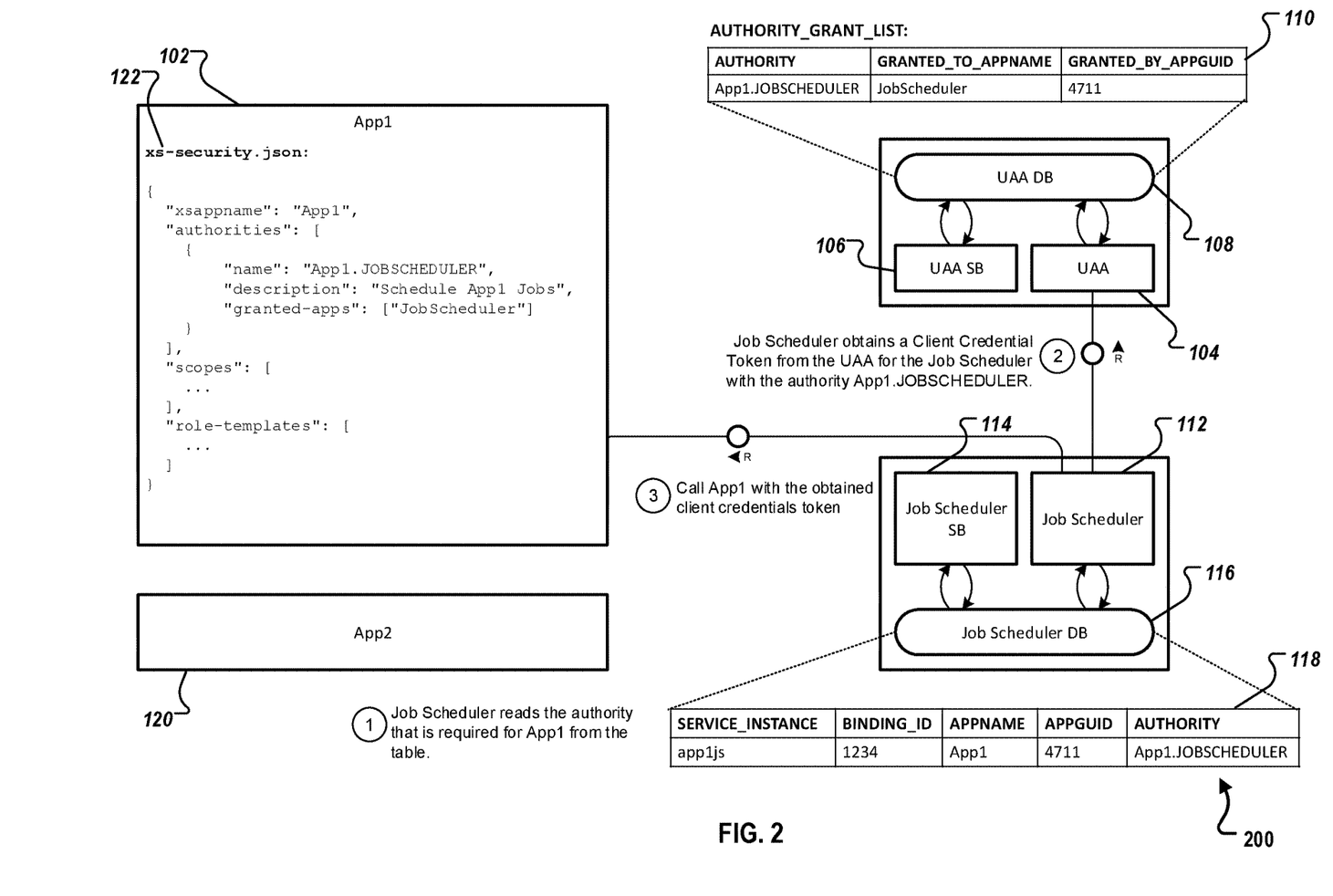
FIG. 2 is a flowchart illustrating an example method for a calling application to trigger a job execution at a called application, according to an implementation.

FIG. 2 is a flowchart illustrating an example method 200 for a calling application to trigger a job execution at a called application, according to an implementation. For clarity of presentation, the description that follows generally describes method 200 in the context of the other figures in this description. However, it will be understood that method 200 may be performed, for example, by any suitable system, environment, software, and hardware, or a combination of systems, environments, software, and hardware as appropriate. In some implementations, various steps of method 100 can be run in parallel, in combination, in loops, or in any order.

At step 1, when the time comes for the job scheduler application 112 to trigger a job at App1 102, the job scheduler application 112 reads from the service instance table 118 which authority/ies it needs to get a token for from the UAA 104. For example, from the service instance table 118, the job scheduler application 112 can determine that App1 102 has granted authority "App1.JOBSCHEDULER" to the job scheduler application 112. From step 1, method 200 proceeds to step 2.

At step 2, the job scheduler application 112 contacts the UAA 104 to request a client credential token for App1 102, and in response the UAA 104 returns a token. The job scheduler application 112 can also indicate to the UAA 104 that the token should include the authority/ies that were determined from step 1. The job scheduler application 112 can obtain a token for its own OAuth client via the OAuth Client Credentials Flow. For example, the job scheduler application 112 can include the authority "App1.JOBSCHEDULER" in the request sent to the UAA 104, in response the UAA 104 can send a token, for example, a JWT or other type of token, including the authority "App1.JOBSCHEDULER. In some implementations, the UAA 104 can apply a filter so that the token returned to the job scheduler application 112 includes only the authority indicated in the request, constraining the power of the calling application in the called application. In some cases, JWT tokens obtained by an OAuth client on behalf of an end-user in the OAuth Authorization Code Flow contain scopes, and JWT tokens obtained by an OAuth client on its own behalf in the OAuth Client Credentials Flow contain authorities. From step 2, method 200 proceeds to step 3.

At step 3, after receiving the token from the UAA 104, the job scheduler application 112 calls App1 102 using the received token to trigger a job execution at App1 102 (for example, executing all or a part of App1's codes). For example, the job scheduler application 112 can call App1 102 with the received token that includes the authority "App1.JOBSCHEDULER." From step 3, method 200 proceeds to step 4.

At step 4, App1 102 validates the token from the job scheduler application 112 to determine if the token includes the right authority "App1.JOB SCHEDULER" that App1 102 has granted. In some implementations, App1 102 can call Container Security APIs to validate tokens. For example, the Container Security APIs can be enhanced to support client credentials tokens and to support checking authorities so that App1 102 can check that the calling OAuth client has the desired authority "App1.JOBSCHEDULER." The container security APIs can also enable authentication with client credentials JWT tokens and support querying the authorities of said tokens. In some implementations, the called applications need to be structured in a way as to distinguish between scheduled jobs authenticated by a client credentials token from regular end-user calls to the same application. From step 4, method 200 stops.

Figure 3:
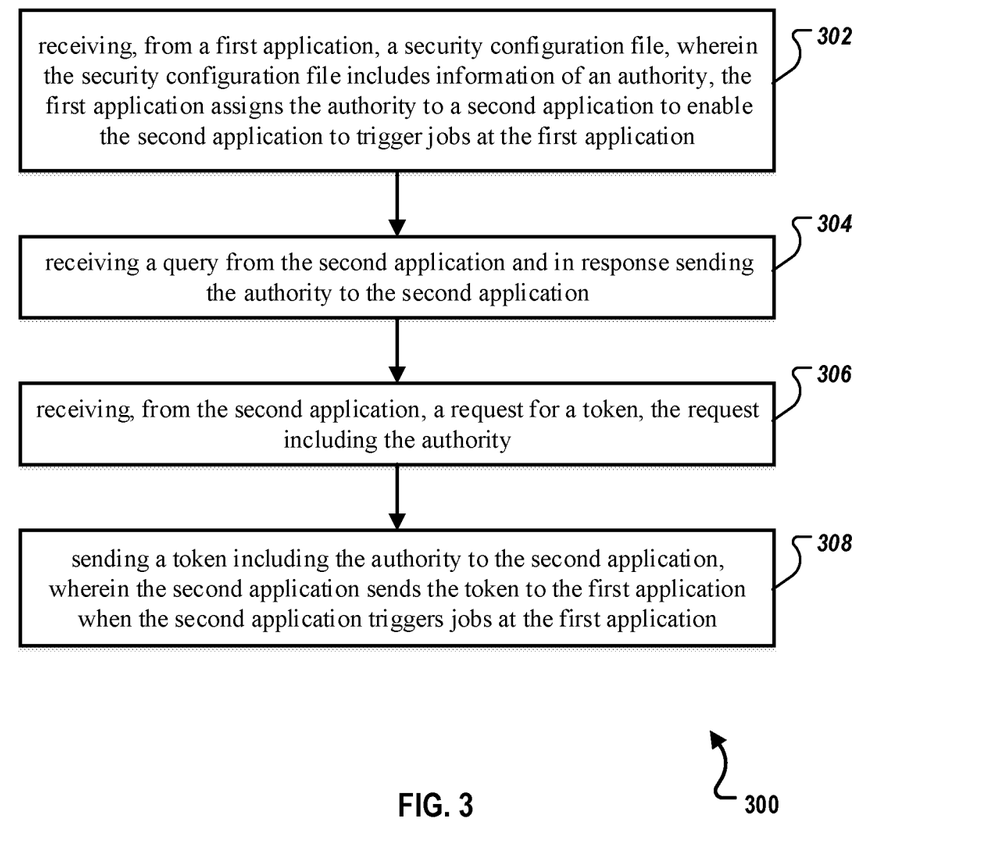
FIG. 3 is a flowchart illustrating an example method for secure calls between applications, according to an implementation.

FIG. 3 is a flowchart illustrating an example method 300 for secure calls between applications, according to an implementation. For clarity of presentation, the description that follows generally describes method 300 in the context of the other figures in this description. However, it will be understood that method 300 may be performed, for example, by any suitable system, environment, software, and hardware, or a combination of systems, environments, software, and hardware as appropriate. In some implementations, various steps of method 300 can be run in parallel, in combination, in loops, or in any order.

At 302, as discussed in step 1 of FIG. 1, during a deployment of a first application, a UAA can receive a security configuration file from the first application. The security configuration file can include information of an authority that is assigned by the first application to a second application so that the first application empowers the second application to trigger jobs at the first application. The second application can provide shared services to a plurality of applications including the first application. For example, the second application can be a central job scheduler. The security configuration file can be a JSON file that includes a section called "authorities" specifying the name of the authority and the application the authority is granted to. The UAA can also query a cloud controller for the GUID of the first application. The UAA can store the name of the authority, the GUID of the first application, and the name of the second application in a table. From 302, method 300 proceeds to 304.

At 304, as discussed in step 5 of FIG. 1, the UAA receives a query from the second application and in response the UAA sends the authority to the second application. For example, the second application can query the UAA for the authority that the first application has granted to the second application by using the GUID of the first application, and the UAA can return the name of the authority to the second application. In some implementations, the UAA sends the name of the authority to the OAuth client of the second application. From 304, method 300 proceeds to 306.

At 306, as discussed in step 2 of FIG. 2, before the second application triggers jobs at the first application, the second application sends a request to the UAA, requesting for a token for the first application. The request can include the name of the authority that the first application has granted to the second application and indicate that the token should include this authority. From 306, method 300 proceeds to 308.

At 308, the UAA sends a token including the authority to the second application. For example, the UAA can send the token to the OAuth client of the second application. When the second application calls the first application to trigger jobs, the second application sends the token received from the UAA to the first application, where the token includes the authority that the first application has granted to the second application. The token can be a JWT. After the first application receives the token from the second application, the first application can verify that the authority in the token is the authority that the first application has granted to the second application. From 308, method 300 stops.

Figure 4:
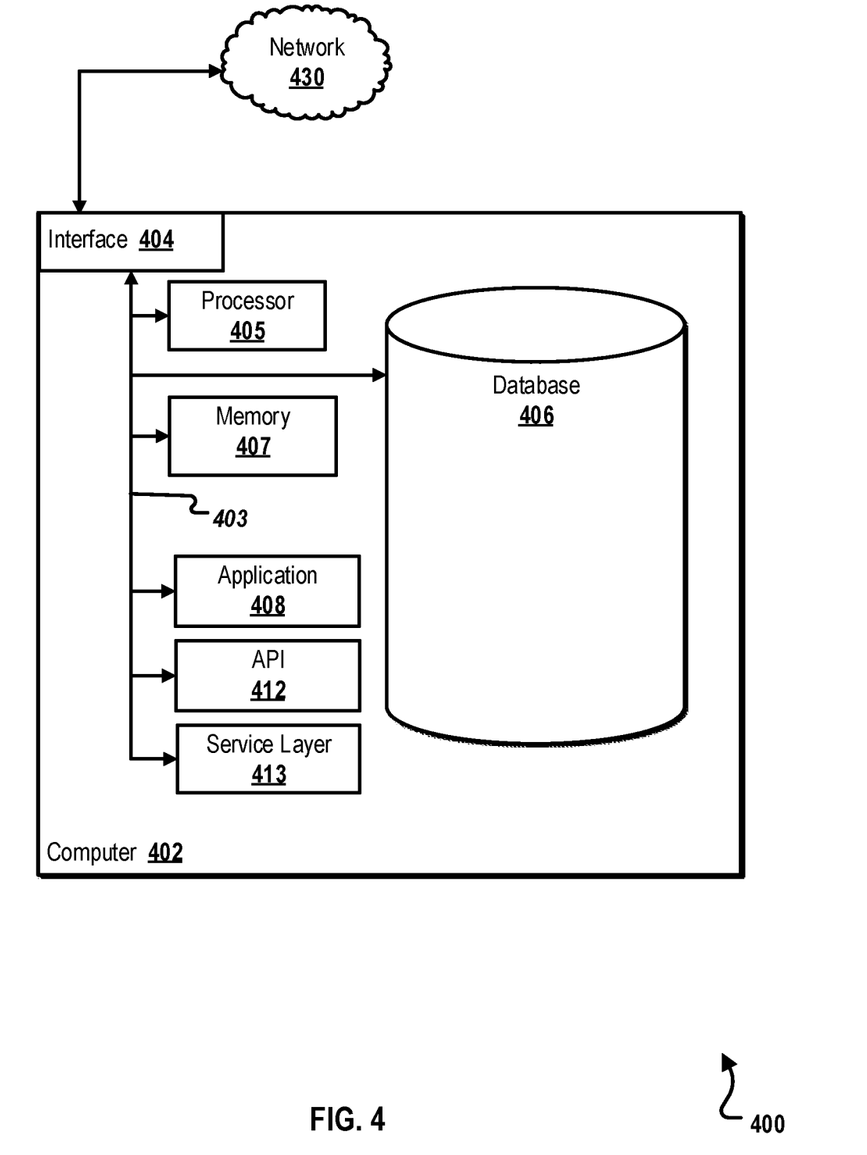
FIG. 4 is a block diagram illustrating an exemplary computer system used to provide computational functionalities associated with described algorithms, methods, functions, processes, flows, and procedures as described in the instant disclosure, according to an implementation.

FIG. 4 is a block diagram illustrating an exemplary computer system 400 used to provide computational functionalities associated with described algorithms, methods, functions, processes, flows, and procedures as described in the instant disclosure, according to an implementation. The illustrated computer 402 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 402 may comprise a computer that includes an input device, such as a keypad, keyboard, touch screen, or other device that can accept user information, and an output device that conveys information associated with the operation of the computer 402, including digital data, visual, or audio information (or a combination of information), or a graphical user interface (GUI).

The computer 402 can serve in a role as a client, network component, a server, a database or other persistency, or any other component (or a combination of roles) of a computer system for performing the subject matter described in the instant disclosure. The illustrated computer 402 is communicably coupled with a network 430. In some implementations, one or more components of the computer 402 may be configured to operate within environments, including cloud-computing-based, local, global, or other environment (or a combination of environments).

At a high level, the computer 402 is an electronic computing device operable to receive, transmit, process, store, or manage data and information associated with the described subject matter. According to some implementations, the computer 402 may also include or be communicably coupled with an application server, e-mail server, web server, caching server, streaming data server, or other server (or a combination of servers).

The computer 402 can receive requests over network 430 from a client application (for example, executing on another computer 402) and responding to the received requests by processing the said requests in an appropriate software application. In addition, requests may also be sent to the computer 402 from internal users (for example, from a command console or by other appropriate access method), external or third-parties, other automated applications, as well as any other appropriate entities, individuals, systems, or computers.

Each of the components of the computer 402 can communicate using a system bus 403. In some implementations, any or all of the components of the computer 402, both hardware or software (or a combination of hardware and software), may interface with each other or the interface 404 (or a combination of both) over the system bus 403 using an application programming interface (API) 412 or a service layer 413 (or a combination of the API 412 and service layer 413). The API 412 may include specifications for routines, data structures, and object classes. The API 412 may be either computer-language independent or dependent and refer to a complete interface, a single function, or even a set of APIs. The service layer 413 provides software services to the computer 402 or other components (whether or not illustrated) that are communicably coupled to the computer 402. The functionality of the computer 402 may be accessible for all service consumers using this service layer. Software services, such as those provided by the service layer 413, provide reusable, defined functionalities through a defined interface. For example, the interface may be software written in JAVA, C++, or other suitable language providing data in extensible markup language (XML) format or other suitable format. While illustrated as an integrated component of the computer 402, alternative implementations may illustrate the API 412 or the service layer 413 as stand-alone components in relation to other components of the computer 402 or other components (whether or not illustrated) that are communicably coupled to the computer 402. Moreover, any or all parts of the API 412 or the service layer 413 may be implemented as child or sub-modules of another software module, enterprise application, or hardware module without departing from the scope of this disclosure.

The computer 402 includes an interface 404. Although illustrated as a single interface 404 in FIG. 4, two or more interfaces 404 may be used according to particular needs, desires, or particular implementations of the computer 402. The interface 404 is used by the computer 402 for communicating with other systems in a distributed environment that are connected to the network 430 (whether illustrated or not). Generally, the interface 404 comprises logic encoded in software or hardware (or a combination of software and hardware) and operable to communicate with the network 430. More specifically, the interface 404 may comprise software supporting one or more communication protocols associated with communications such that the network 430 or interface's hardware is operable to communicate physical signals within and outside of the illustrated computer 402.

The computer 402 includes a processor 405. Although illustrated as a single processor 405 in FIG. 4, two or more processors may be used according to particular needs, desires, or particular implementations of the computer 402. Generally, the processor 405 executes instructions and manipulates data to perform the operations of the computer 402 and any algorithms, methods, functions, processes, flows, and procedures as described in the instant disclosure.

The computer 402 also includes a database 406 that can hold data for the computer 402 or other components (or a combination of both) that can be connected to the network 430 (whether illustrated or not). For example, database 406 can be an in-memory, conventional, or other type of database storing data consistent with this disclosure. In some implementations, database 406 can be a combination of two or more different database types (for example, a hybrid in-memory and conventional database) according to particular needs, desires, or particular implementations of the computer 402 and the described functionality. Although illustrated as a single database 406 in FIG. 4, two or more databases (of the same or combination of types) can be used according to particular needs, desires, or particular implementations of the computer 402 and the described functionality. While database 406 is illustrated as an integral component of the computer 402, in alternative implementations, database 406 can be external to the computer 402.

The computer 402 also includes a memory 407 that can hold data for the computer 402 or other components (or a combination of both) that can be connected to the network 430 (whether illustrated or not). For example, memory 407 can be random access memory (RAM), read-only memory (ROM), optical, magnetic, and the like storing data consistent with this disclosure. In some implementations, memory 407 can be a combination of two or more different types of memory (for example, a combination of RAM and magnetic storage) according to particular needs, desires, or particular implementations of the computer 402 and the described functionality. Although illustrated as a single memory 407 in FIG. 4, two or more memories 407 (of the same or combination of types) can be used according to particular needs, desires, or particular implementations of the computer 402 and the described functionality. While memory 407 is illustrated as an integral component of the computer 402, in alternative implementations, memory 407 can be external to the computer 402.

The application 408 is an algorithmic software engine providing functionality according to particular needs, desires, or particular implementations of the computer 402, particularly with respect to functionality described in this disclosure. For example, application 408 can serve as one or more components, modules, applications, etc. Further, although illustrated as a single application 408, the application 408 may be implemented as multiple applications on the computer 402. In addition, although illustrated as integral to the computer 402, in alternative implementations, the application 408 can be external to the computer 402.

There may be any number of computers 402 associated with, or external to, a computer system containing computer 402, each computer 402 communicating over network 430. Further, the term "client," "user," and other appropriate terminology may be used interchangeably as appropriate without departing from the scope of this disclosure. Moreover, this disclosure contemplates that many users may use one computer 402, or that one user may use multiple computers 402.

Described implementations of the subject matter can include one or more features, alone or in combination.

For example, in a first implementation, a computer-implemented method includes: receiving, from a first application, a security configuration file, where the security configuration file includes information of an authority, the first application assigns the authority to a second application to enable the second application to trigger jobs at the first application, and the second application provides shared services to a plurality of applications including the first application; receiving a query from the second application and in response sending the authority to the second application; receiving, from the second application, a request for a token, the request including the authority; and sending a token including the authority to the second application, where the second application sends the token to the first application when the second application triggers jobs at the first application.

The foregoing and other described implementations can each optionally include one or more of the following features:

A first feature, combinable with any of the following features, where receiving the security configuration file and sending the authority to the second application occur during a deployment of the first application.

A second feature, combinable with any of the previous or following features, where the security configuration file is a JSON file.

A third feature, combinable with any of the previous or following features, where the token is a JSON web token.

A fourth feature, combinable with any of the previous or following features, where the second application has an OAuth client, sending the authority to the second application includes sending the authority to the OAuth client of the second application, and sending the token to the second application includes sending the token to the OAuth client of the second application.

A fifth feature, combinable with any of the previous or following features, where when the second application triggers jobs at the first application, the first application validates the authority in the token received from the second application.

A sixth feature, combinable with any of the previous or following features, where the method further includes, in response to receiving the security configuration file: creating a UAA service instance; binding the UAA service instance to the first application; querying a cloud controller for a GUID of the first application; and storing the authority, the GUID of the first application, and a name of the second application.

In a second implementation, a non-transitory, computer-readable medium storing one or more instructions executable by a computer system to perform operations including: receiving, from a first application, a security configuration file, where the security configuration file includes information of an authority, the first application assigns the authority to a second application to enable the second application to trigger jobs at the first application, and the second application provides shared services to a plurality of applications including the first application; receiving a query from the second application and in response sending the authority to the second application; receiving, from the second application, a request for a token, the request including the authority; and sending a token including the authority to the second application, where the second application sends the token to the first application when the second application triggers jobs at the first application.

The foregoing and other described implementations can each optionally include one or more of the following features:

A first feature, combinable with any of the following features, where receiving the security configuration file and sending the authority to the second application occur during a deployment of the first application.

A second feature, combinable with any of the previous or following features, where the security configuration file is a JSON file.

A third feature, combinable with any of the previous or following features, where the token is a JSON web token.

A fourth feature, combinable with any of the previous or following features, where the second application has an OAuth client, sending the authority to the second application includes sending the authority to the OAuth client of the second application, and sending the token to the second application includes sending the token to the OAuth client of the second application.

A fifth feature, combinable with any of the previous or following features, where when the second application triggers jobs at the first application, the first application validates the authority in the token received from the second application.

A sixth feature, combinable with any of the previous or following features, comprising one or more instructions to, in response to receiving the security configuration file: create a UAA service instance; bind the UAA service instance to the first application; query a cloud controller for a GUID of the first application; and store the authority, the GUID of the first application, and a name of the second application.

In a third implementation, a computer-implemented system includes a computer memory, and a hardware processor interoperably coupled with the computer memory and configured to perform operations including: receiving, from a first application, a security configuration file, where the security configuration file includes information of an authority, the first application assigns the authority to a second application to enable the second application to trigger jobs at the first application, and the second application provides shared services to a plurality of applications including the first application; receiving a query from the second application and in response sending the authority to the second application; receiving, from the second application, a request for a token, the request including the authority; and sending a token including the authority to the second application, where the second application sends the token to the first application when the second application triggers jobs at the first application.

The foregoing and other described implementations can each optionally include one or more of the following features:

A first feature, combinable with any of the following features, where receiving the security configuration file and sending the authority to the second application occur during a deployment of the first application.

A second feature, combinable with any of the previous or following features, where the security configuration file is a JSON file.

A third feature, combinable with any of the previous or following features, where the second application has an OAuth client, sending the authority to the second application includes sending the authority to the OAuth client of the second application, and sending the token to the second application includes sending the token to the OAuth client of the second application.

A fourth feature, combinable with any of the previous or following features, where when the second application triggers jobs at the first application, the first application validates the authority in the token received from the second application.

A fifth feature, combinable with any of the previous or following features, further configured to, in response to receiving the security configuration file: create a UAA service instance; bind the UAA service instance to the first application; query a cloud controller for a GUID of the first application; and store the authority, the GUID of the first application, and a name of the second application.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate. Thresholds used to make computational determinations can be statically, dynamically, or both statically and dynamically determined.

The methods, processes, logic flows, etc. described in this specification can be performed by one or more programmable computers executing one or more computer programs to perform functions by operating on input data and generating output. The methods, processes, logic flows, etc. can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/–R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
receiving, at an authentication application and from a first application, a security configuration file that is a JavaScript Object Notation (JSON) file, wherein the security configuration file includes an authority object, wherein the authority object is a JSON object which indicates that the first application authorizes a second application to trigger jobs at the first application, and wherein the second application provides shared services to a plurality of applications including the first application;
receiving, at the authentication application, a query from the second application and in response sending the authority object to the second application;
receiving, at the authentication application and from the second application, a request for a token, the request including the authority object, wherein the request is separate from the query; and
sending, by the authentication application, a token including the authority object to the second application, wherein the token is a JSON web token (JWT), wherein the second application sends the token to the first application when the second application triggers jobs at the first application; and wherein the first application validates the authority object in the token received from the second application when the second application triggers jobs at the first application.

2. The computer-implemented method of claim 1, wherein receiving the security configuration file and sending the authority to the second application occur during a deployment of the first application.

3. The computer-implemented method of claim 1, wherein the second application has an Open Authorization (OAuth) client, sending the authority to the second application includes sending the authority to the OAuth client of the second application, and sending the token to the second application includes sending the token to the OAuth client of the second application.

4. The computer-implemented method of claim 1, further comprising, in response to receiving the security configuration file:
creating a user account and authentication (UAA) service instance;
binding the UAA service instance to the first application;
querying a cloud controller for a global unique identifier (GUID) of the first application; and
storing the authority, the GUID of the first application, and a name of the second application.

5. A non-transitory, computer-readable medium storing one or more instructions executable by a computer system to perform operations comprising:
receiving, at an authentication application and from a first application, a security configuration file that is a JavaScript Object Notation (JSON) file, wherein the security configuration file includes an authority object, wherein the authority object is a JSON object which indicates that the first application authorizes a second application to trigger jobs at the first application, and wherein the second application provides shared services to a plurality of applications including the first application;

receiving, at the authentication application, a query from the second application and in response sending the authority object to the second application;

receiving, at the authentication application and from the second application, a request for a token, the request including the authority object, wherein the request is separate from the query; and sending, by the authentication application, a token including the authority object to the second application, wherein the token is a JSON web token (JWT), wherein the second application sends the token to the first application when the second application triggers jobs at the first application; and wherein the first application validates the authority object in the token received from the second application when the second application triggers jobs at the first application.

6. The non-transitory, computer-readable medium of claim 5, wherein receiving the security configuration file and sending the authority to the second application occur during a deployment of the first application.

7. The non-transitory, computer-readable medium of claim 5, wherein the second application has an Open Authorization (OAuth) client, sending the authority to the second application includes sending the authority to the OAuth client of the second application, and sending the token to the second application includes sending the token to the OAuth client of the second application.

8. The non-transitory, computer-readable medium of claim 5, comprising one or more instructions to, in response to receiving the security configuration file:

create a user account and authentication (UAA) service instance;

bind the UAA service instance to the first application;

query a cloud controller for a global unique identifier (GUID) of the first application; and store the authority, the GUID of the first application, and a name of the second application.

9. A computer-implemented system, comprising:

a computer memory; and a hardware processor interoperably coupled with the computer memory and configured to perform operations comprising:

receiving, at an authentication application and from a first application, a security configuration file that is a JavaScript Object Notation (JSON) file, wherein the security configuration file includes an authority object, wherein the authority object is a JSON object which indicates that the first application authorizes a second application to trigger jobs at the first application, and wherein the second application provides shared services to a plurality of applications including the first application;

receiving, at the authentication application, a query from the second application and in response sending the authority object to the second application;

receiving, at the authentication application and from the second application, a request for a token, the request including the authority object, wherein the request is separate from the query; and sending, by the authentication application, a token including the authority object to the second application, wherein the token is a JSON web token (JWT), wherein the second application sends the token to the first application when the second application triggers jobs at the first application; and wherein the first application validates the authority object in the token received from the second application when the second application triggers jobs at the first application.

10. The computer-implemented system of claim 9, wherein receiving the security configuration file and sending the authority to the second application occur during a deployment of the first application.

11. The computer-implemented system of claim 9, wherein the second application has an Open Authorization (OAuth) client, sending the authority to the second application includes sending the authority to the OAuth client of the second application, and sending the token to the second application includes sending the token to the OAuth client of the second application.

12. The computer-implemented system of claim 9, further configured to, in response to receiving the security configuration file:

create a user account and authentication (UAA) service instance;

bind the UAA service instance to the first application;

query a cloud controller for a global unique identifier (GUID) of the first application; and store the authority, the GUID of the first application, and a name of the second application.

* * * * *